Figure 1:
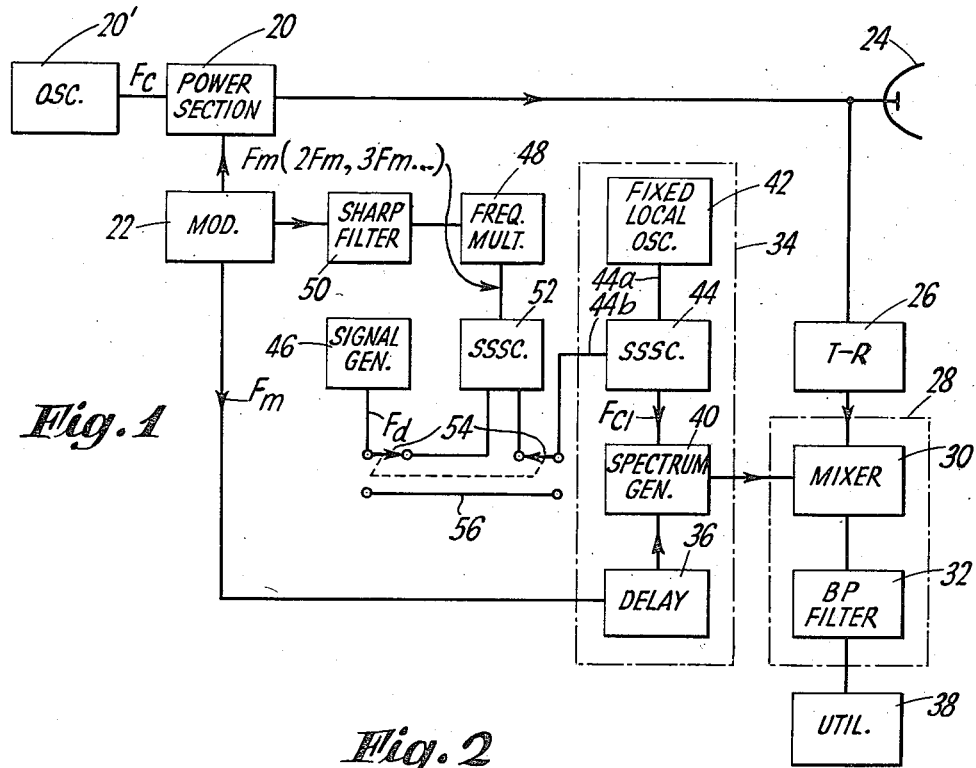

INVENTOR
HUNTER C. HARRIS, JR.

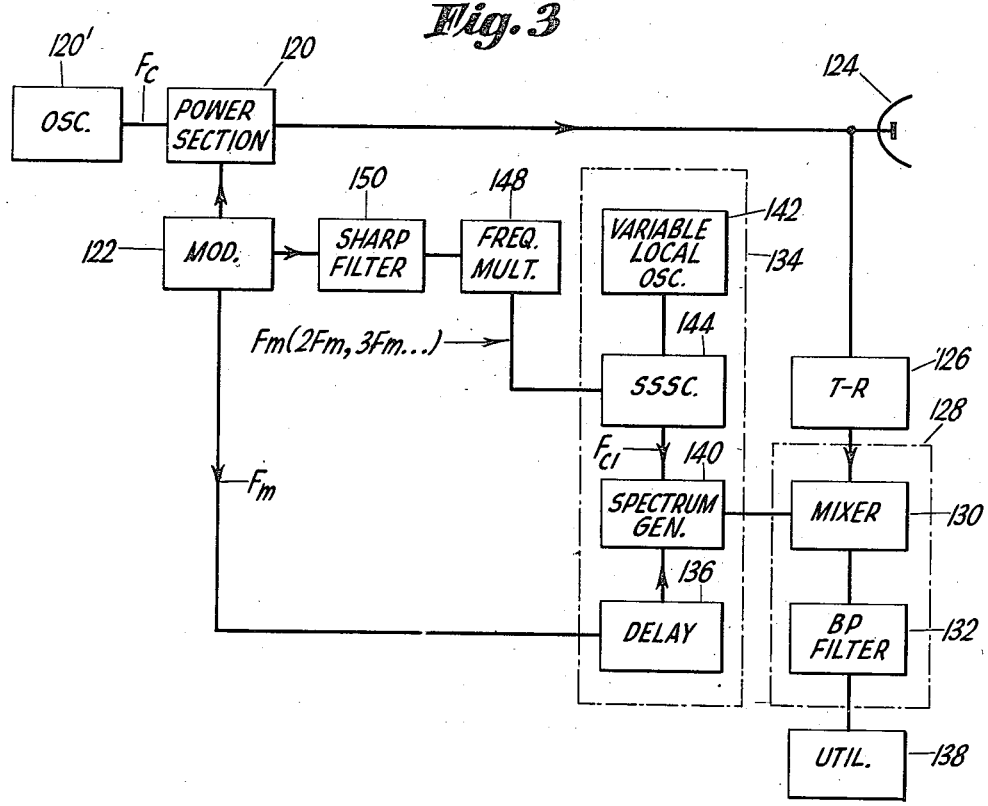

United States Patent Office 2,834,956
Patented May 13, 1958

2,834,956

REDUCING DOPPLER SEARCH TIME IN CROSS-CORRELATION SYSTEMS

Hunter C. Harris, Jr., Roslyn Heights, N. Y., assignor to Sylvania Electric Products Inc., a corporation of Massachusetts Application May 10, 1952, Serial No. 287,163

8 Claims. (Cl. 343—14)

The present invention relates to signal correlation systems, and in particular their application to radar, including novel methods of utilizing signals for orientation, as in navigation. The invention, while of broader application in its various aspects, is herein discussed in connection with modulated carrier radar.

Navigational systems have been described that are highly immune to certain types of interference, utilizing the principle of cross-correlation. In these systems a signal is transmitted through a path where noise, random interference and multi-path transmissions may be superimposed on the signal. As described in United States Patent 2,690,558, a transmitted signal is cross-correlated with a locally generated signal by multiplying the two signals together and integrating the product. The received and locally generated signals here considered need not be of the same carrier frequency but the modulation characteristics are alike as to phase and frequency, or of the same repetition rate and timing in the special modulation form of pulsed systems. In the event that the signal that is transmitted and the like locally generated signal have broad spectra the cross-correlation of the two signals for determining phase identity becomes highly critical. The delay in transmission is measured by adjustment of a control which shifts the timing or phase of the locally generated signal so that phase identity of the transmitted signal and the locally generated signal is achieved.

The highly selective cross-correlation system of comparing the signals is ordinarily such that moving targets (or stationary targets detected by a moving radar) introduce a Doppler shift of frequency of each of the components in the spectrum of the transmitted signal. This might result in total lack of response of the cross-correlation apparatus. In one aspect the present invention enables detection of targets in a radar search region where a target and the radar move fast enough relative to each other to produce a significant Doppler frequency-shift. In a further aspect the invention enables improved detection of a moving target at a particular range selectively despite potential interference by signals from other targets that may be moving at the same relative speed at different ranges, or by interference from other targets moving at different speeds at the same range as the particular target.

In an important application of the present invention, radars incorporate a cross-correlation receiver in which the spectrum of a locally developed signal is multiplied with the spectra of received signals, and the products are integrated in a highly selective filter, whose pass band is narrow enough to achieve integration over at least the modulation period of the transmitted signal. Where the Doppler shift of frequency of a particular echo spectrum is slight yet sufficiently great to fall outside the passband of the filter, a similar frequency shift of the locally generated spectrum is here produced, in achieving one object of the invention. A frequency shifter is used for this in one embodiment of the invention described in detail below, including for example a variable frequency oscillator combined with a single-sideband-suppressed-carrier modulator, so that the locally generated signal has a shifted spectrum that matches a particular Doppler-shifted signal that is received after reflection from a relatively moving target. The normal, unshifted signal may, to advantage, have a carrier-frequency different from that of the transmitted signal by that for which the filter is designed; or the carriers may be the same in frequency where a narrow-band low-pass filter is used.

Shifting the carrier frequency of the local signal is effected gradually by adjusting an oscillator frequency, allowing time for the integration process after each adjustment. One modulation period is the minimum required time for each adjustment, but a longer period may be required in the event that the signal is exposed to excessive interference.

The time required for this gradual search is usually moderate. The information obtained can be translated into relative velocity of the radar and the target, or the apparatus can be directly calibrated to give relative velocity. For high velocities, however, where the Doppler shift of frequency of the carrier and the sidebands in the reflected spectrum greatly exceeds the modulation frequency, the velocity measured is ambiguous as will be seen. Accordingly, a further object of the present invention is to obtain accurate velocity measurement free of ambiguity in a cross-correlation radar. A more general purpose of the invention is to achieve signal correlation rapidly, or more specifically to achieve a maximum of response in a cross-correlation navigational system involving frequency-shifted signals such as those reflected from objects moving relative to a radar. A further broad object is to adapt cross-correlation receivers to reliable, rapid and sensitive response to frequency-shifted forms of a signal available at the receiver. An additional important object is to adapt cross-correlation receivers to rapid and unambiguous recognition of targets whose relative speed produces a Doppler frequency shift exceeding the modulation frequency of the comparison spectrum available in the receiver.

A further object of the invention is to provide a novel radar that is relatively insensitive to objects other than those at a particular range and moving at a particular speed in relation to the radar.

In the following detailed disclosure of two illustrative embodiments of the invention it will be seen that the spectrum of a locally generated signal is compared for phase coincidence with a received echo signal by cross-correlation. The signal of a local oscillator is modulated at the same frequency as the modulation of the transmitted signal. Two adjustments are then effected, one for establishing phase identity between the modulation envelopes, and a second for obtaining correspondence between the sideband components and the carrier of the reflected signal respectively with the sideband components and the carrier of the locally generated signal. The terms "correspond" and "correspondence" are used here because the carrier frequencies might be identical in the event that the integrating portion used in the cross-correlator were designed for products of spectra having the same carrier frequencies, as a low-pass filter or the equivalent as mentioned above. However, the cross-correlation principle has practical advantages in the comparison of signal spectra whose carrier frequencies differ, in which case the integration is desirably effected in a narrow bandpass filter at the difference-frequency or beat-frequency of the two carriers.

It is possible to obtain several maxima at the output of the correlator to measure ambiguously the relative velocity of the target and the cross-correlation receiver. Correspondence between the several sidebands of one signal with other sidebands of the comparison signal in the cross-correlator will yield a number of subsidiary maxima. By shifting the carrier frequency of the local source of oscillations gradually a first subsidiary maximum is obtained; and thereafter by shifting that carrier stepwise at modulation-frequency intervals, a true maximum response is realized at the output of the cross-correlator, eliminating the ambiguity. The subsidiary maxima are useful first for indicating presence of a target at the range for which the system is adjusted, and, additionally, to minimize the search time as a preliminary to the stepwise frequency adjustment after an ambiguous indication is obtained.

Figure 2:
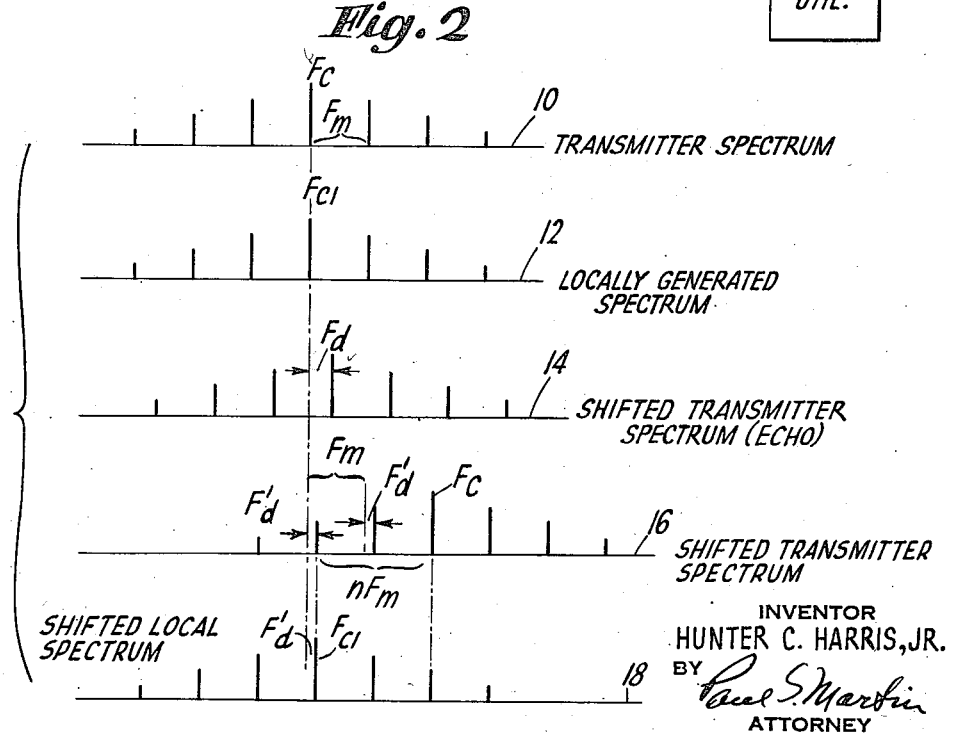

The nature of the invention and various further objectives and features of novelty will be better appreciated from the following detailed description of illustrative embodiments thereof shown in the accompanying drawings. Figure 1 is a block diagram of a radar employing features of the present invention. Figure 2 is a graphical representation of signal spectra appearing in the cross-correlator showing relative timing under various conditions. Figure 3 is a block diagram of a modification of the embodiment in Figure 1.

Referring first to Figure 2 a first spectrum 10 is shown having a center component $F_c$, the carrier frequency of the transmitted signal, together with a series of sideband components. In the amplitude-modulated system illustrated the sideband components are disposed to both sides of the carrier frequency, spaced apart regularly by intervals of the modulation frequency $F_m$. Spectrum 10 represents the signal of a radar as it is radiated. A locally generated spectrum 12 is also shown having the same modulation characteristics so that the timing of the modulation envelopes agree and these envelopes are similar. The local carrier frequency $F_{cl}$ corresponds to $F_c$, that is, $F_{cl}$ is identical with $F_c$ or differs therefrom by a predetermined frequency difference determined by the form of the cross-correlator used. The transmitter spectrum 10 and the locally generated spectrum 12 when cross-correlated will yield a maximum output. Because of phase identity of the two signals the cross product of $F_c$ and $F_{cl}$ will add to the cross products of the first sidebands of the two signals, to the second sidebands of the two signals and so on.

If the spectrum of the transmitted signal is subjected to a Doppler frequency shift $F_d$ by an amount that is small relative to $F_m$ the spectrum 14 is produced. With a properly discriminating cross correlator energized by spectra 12 and 14 there would be no output despite phase identity between them. By shifting the locally generated signal or the received signal by the Doppler frequency-shift $F_d$, the ideal correspondence is realized as described previously, giving maximum output from the correlator.

As a practical matter it happens that the Doppler frequency-shift $F_d$ that must be taken into account is often much greater than the modulation or pulse frequency $F_m$ so that it is not unlikely that spectrum 16 may be produced. In spectrum 16, the carrier is shifted an extent $nF_m$ (where $n$ is any integer) plus a slight additional extent $F_d'$ less than $F_m$. If a frequency shift $F_d'$ is imposed on local spectrum 12 to provide spectrum 18, several of its sidebands will correspond with several of the echo sidebands (spectrum 16). This shift $F_d'$ will yield a subsidiary maximum in the cross-correlator, where $nF_m$ is other than zero, which subsidiary maximum is less than the true maximum obtained where the carrier frequencies are in correspondence.

The frequency shift $F_d'$ can be achieved gradually, in small steps, to allow for integration after each adjustment. True correspondence between spectra 12 and 14 can be achieved gradually within a reasonable period of time. However, if this gradual process were attempted for adjusting spectrum 12 for correspondence will echo spectrum 16, an excessive time would be required. This is greatly expedited by slowly adjusting the frequency shift of spectrum 12 first through the range $F_d'$ to achieve correspondence between certain sidebands of the reference signal with sidebands of the echo signal to yield spectrum 18 and then, in a separate operation, adjusting local spectrum 18 in large steps $F_m$ until $F_{cl}$ of spectrum 18 corresponds to $F_c$ of the shifted (echo) spectrum 16. This vastly reduces the search time required for obtaining true maximum response from the cross-correlator. It also enables unambiguous derivation of the relative velocity of a cross-correlator and the Doppler shifted signal source.

A radar capable of achieving these frequency shifts is shown in Figure 1. A conventional transmitter is shown including a high frequency power source 20, an oscillator 20', provided with a pulse modulator 22. The oscillator and the power source are shown as separate elements but in practice where a pulse type radar is used these would be a single source of pulsed oscillations, such as a magnetron, producing a transmitted signal whose repetition rate is determined by modulator 22. The carrier frequency $F_c$ is accordingly amplitude-modulated to produce a spectrum like that shown at 10 in Figure 2 having a component $F_c$ and sidebands spaced at regular frequency intervals $F_m$ above and below $F_c$ in the case of amplitude modulation. This signal is radiated by antenna 24 and in the radar shown, a reflected signal is received at antenna 24 and applied through duplexer or T–R switch tube 26 to a cross-correlator 28 including mixer 30 that functions as a spectrum multiplier, and bandpass filter 32 that functions as an integrator. The locally developed signal that is to be correlated with that supplied through duplexer 26 is developed in source 34, having a carrier frequency that is the same as, or different by a predetermined frequency from, the carrier frequency of oscillator 20', in dependence upon the design of integrator 32. It is of advantage to design integrator 32 as a very narrow band-pass beat frequency filter and amplifier in which case the carrier of the signal supplied by source 34 differs from that of oscillator 20' by the center-band frequency of this filter, and the pass-band width is $F_m$.

The modulation characteristics of the signal supplied by source 34 are broadly the same as the modulation of the transmitted and reflected signal. The relative amplitude of the two spectra need not be alike and the transmitted spectrum may be shaped by suitable filters to be appreciably narrower than the spectrum produced by local signal generator 34, as in copending application Serial No. 240,414 filed August 4, 1951, by the present applicant jointly with M. Leifer and D. Cawood. The modulation frequency and phase of the signal supplied by unit 34 are critical characteristics of that comparison signal. The modulation signal supplied by modulator 22 of the transmitter is transmitted through delay unit 36 and spectrum generator 40 to correlator 28. Delay unit 36 is made adjustable so that the phase of the modulated signal output of source 34 can be made the same as that received and transmitted through duplexer 26 to the cross-correlator. This takes into account the effect of range on the echo signal, as is more fully explained in the Harvey application identified above.

The signal developed in unit 34 results from the modulation in spectrum generator 40 of the modulation transmitted by delay unit 36 and impressed on the local oscillator signal from fixed local oscillator 42. The oscillation is transmitted through single sideband suppressed carrier modulator (SSSC) 44. Modulator 44 has two input circuits, including wires 44a and 44b. In the event that there is no input signal from wire 44b the local oscillator signal is amplitude-modulated in unit 40 without shift in frequency to provide the spectrum 12 having the modulation wave form of unit 22 and the phase determined by delay unit 36. Modulator 44 with the control circuit connected to line 44b constitutes a frequency shifter that is used for changing the frequency supplied by fixed local oscillator 42 alone.

In detecting a target that is not moving relative to the radar at any desired range delay unit 36 is adjusted appropriate to that range and signals reflected from a target and reaching cross-correlator 28 will yield a maximum of output to utilization device 38. In this condition the cross-correlator will be relatively insensitive to targets moving at an appreciable speed relative to the radar. In order to detect relatively moving targets a frequency shifting signal is developed and impressed on wire 44b.

The frequency shifter represented in part by modulator 44 includes at its input circuit a signal generator 46, a frequency multiplier 48 having a sharp filter 50 energized by modulator 22, a second single sideband suppressed carrier modulator 52, a pair of ganged switches 54 and a connecting line 56. With switches 54 set in the position shown the signal impressed on wire 44b will be that generated by unit 46 added to that supplied by the frequency multiplier 48. Sharp filter 50 is adjusted to pass a sine wave of modulation frequency stripped of the harmonics of the modulation signal that may be present, as in the case of a pulse type of modulation. With switches 54 set to connect signal generator 46 directly to single sideband suppressed carrier modulator 44 via line 56, the frequency of local oscillator 42 will be shifted only by the frequency of generator 46. This generator may be a widely variable electronic oscillator or it may actually be an alternating current generator, of a form such as is described in the "Technologist," volume IV, No. 3, page 64, published by Sylvania Electric Products, Inc., Bayside, New York.

In their joint operation, signal generator 46 and local oscillator 42 represent an adjustable source of oscillation adjustable continuously in frequency.

In the form of Figure 1 local oscillator 42 is of fixed frequency design for high stability, and generator 46 is of a type capable of adjustment to any frequency from zero cycles up to the modulation frequency of unit 22.

A particular mode of operation of the apparatus will be described, although it is evident that the device may be used in other ways. It will be assumed that targets at a particular range are the subject of a search. Delay unit 36 is adjusted so that the phase of the modulation on the signal produced by unit 34 corresponds with signals that may be reflected from objects at the particular range, the echo signal having been subjected to delay in transmission from antenna 24 to the target and back.

Switches 54 are first set to couple generator 46 through wire 56 to SSSC modulator 44 and the frequency of this generator is slowly adjusted, or adjusted in small steps, through range $F_d'$ (Fig. 2) until a maximum is realized at the output of correlator 28. This may be a subsidiary maximum represented by the relationship of spectra 16 and 18. Next, switches 54 are returned to the position shown in Figure 1, and multiplier 48 is adjusted stepwise to yield frequencies $F_m$, $2F_m$, $3F_m$, and so forth, until the true maximum is realized at utilization device 38. This results in unambiguous identification of targets moving at a certain relative speed, at a range represented by the setting of delay unit 36. At this time, the carrier frequencies correspond, as do the several sidebands. They are not identical where unit 32 is designed for a beat-frequency. In concept units 42 and 46 can be combined. Such modification is shown in Figure 3 wherein all of the duplicated parts of Figure 1 are identified by 100-series numerals corresponding to the numerals in Figure 1, and wherein the parts are in all instances identical with the exceptions that oscillator 142 in Figure 3 is of variable frequency design and units 46, 52, and switch 54 are eliminated in favor of direct coupling between frequency multiplier 148 and single-side-band-suppressed carrier modulator 144. Variable frequency local oscillator 142 is desirably calibrated in terms of departure from the frequency at which zero-speed targets are detected in order that the frequency of this oscillator may be used as a vernier or fine representation of target relative velocity; or the departure from zero-speed frequency may be calibrated directly in terms of a limited range of relative target speed.

With the frequency multiplier 148 set properly to provide no output and with delay unit 136 set for searching at a certain range, the local oscillator 142 is adjusted until a subsidiary maximum is obtained at the input to utilization device 138. After such indication of maximum, frequency multiplier 148 is adjusted in successive steps to provide either the modulation frequency or twice the modulation frequency or any other harmonic thereof in numerical sequence as an input to "SSSC" modulator 144, until the true maximum is obtained at the output of correlator 128. This indicates correspondence of the reflected signal, as to the carrier and the several sidebands of one signal with the carrier and sidebands of the local spectrum generated. As in the embodiment of Figure 1, identification of a target at a range corresponding to the setting of unit 136 is realized, the relative speed of which is known from the settings of units 142 and 148. Even where this information is not needed the system still identifies one target amid echoes from many.

A variety of modifications and applications of the several features of the invention may readily be practiced by those skilled in the art. Accordingly, the appended claims should be given duly broad interpretation, consistent with the spirit and scope of the invention.

What is claimed is:

1. A navigation system including means for transmitting a signal of predetermined modulation and carrier frequencies and a receiver for detecting echo signals, said transmitting means being provided with a carrier wave generator and modulation means coupled to said generator to modulate the carrier wave yielded by said generator to produce said transmitted signal, said receiver including a variable frequency signal generator, a fixed frequency local oscillator, and a first frequency shift modulator jointly energized by said variable frequency generator and by said local oscillator, said signal generator being adjustable through a frequency range equal to the modulation frequency, a spectrum generator having adjustably phased means to modulate the frequency-shifted local oscillation at the modulation frequency of the transmitting means, a correlator having input connections from said spectrum generator and from the input end of said receiver, whereby said correlator is adapted to yield ambiguous indications of correlation represented by frequency correspondence of a side band of the echo signal with the carrier of the generated spectrum, a variable-factor frequency multiplier coupled at its input to said modulating means to yield a signal of modulation frequency or an integral multiple thereof, and a further frequency shift modulator having an input connection to said frequency multiplier and adapted by switching means to be interposed between said variable frequency generator and the first mentioned frequency shift modulator for eliminating ambiguity of the correlation.

2. In a radar, a transmitter having a modulator, an antenna for radiating the transmitter signal and for receiving an echo signal upon reflection of the radiated signal after a time delay, a cross-correlator including a mixer having two input signal connections, and said cross correlator also including an integrator energized by said mixer, said mixer being coupled to said antenna via one of said input connections, and a spectrum generator connected to the other of said input connections, said spectrum generator including a shiftable-frequency carrier source and having a variable delay connection to said modulator, whereby said radar is selectively responsive to echoes from objects moving at a relative speed dependent on said carrier source, the delay interval established by said variable delay connection being determined by said relative speed.

3. In a radar, a modulator, antenna for receiving a signal from an object that functions as a signal source, a cross-correlator including a mixer having two input signal connections and an integrator energized by said mixer, said mixer being coupled to said antenna via one of said input connections, and a spectrum generator connected to the other of said input connections, said spectrum generator including a shiftable-frequency carrier source and having a variable delay connection to said modulator, whereby said radar is selectively responsive to echoes from objects moving at a relative speed dependent on said carrier source, the delay interval established by said variable delay connection being determined by said relative speed.

4. A correlation radar including a transmitter, a modulator for impressing a periodic signal of modulation frequency on the transmitter and a correlation receiver, said correlation receiver including a spectrum generator energized jointly by a fixed frequency local oscillator and by said modulator, and a variable frequency-shifter interposed between said local oscillator and said spectrum generator, whereby side band components of the transmitted signal are shifted by relative velocity between the transmitter and the reflecting object, and the side band components of the locally generated spectrum may be adjusted into frequency correspondence with the side band components of the transmitted signal.

5. A search radar for objects moving in relation to the radar and which inherently produces a frequency shift of the received spectrum relative to the transmitted spectrum, which radar includes a transmitter, a transmitter modulator producing a signal of predetermined modulation characteristics, a local spectrum generator including a delay device coupled to said modulator and an adjustable carrier-frequency generator, and a correlator energized both by said spectrum generator and by a reflected signal receiving antenna for indicating correlation between the locally generated spectrum and the frequency-shifted signal reflected by an object at a range dependent on said delay device and moving at a rate identified with the adjustment of said carrier frequency-generator.

6. A search radar for targets moving in relation to the radar and which inherently produces a frequency shift of the received spectrum relative to the transmitted spectrum, which radar includes a transmitter, a pulse-type amplitude modulator in said transmitter, a local spectrum generator including a delay device coupled to said modulator and an adjustable carrier-frequency generator, and a correlator energized both by said spectrum generator and by a reflected signal receiving antenna for indicating correlation between the locally generated spectrum and the frequency-shifted signal reflected by an object at a range dependent on said delay device and moving at a rate identified with the adjustment of said carrier frequency generator.

7. A doppler search radar including a transmitter having a modulator and further including a receiver and yielding a transmitted signal having a predetermined frequency spectrum, said receiver including means for generating a spectrum having frequency components corresponding to the transmitted spectrum, means for adjustably shifting the generated spectrum gradually through a range equal to the modulation frequency and additional means for adjustably shifting the spectrum stepwise at modulation frequency intervals.

8. A search radar including a transmitter and an amplitude modulator for producing an amplitude-modulated carrier having a spectrum including a series of regularly spaced side bands, a spectrum generator for locally providing a spectrum corresponding to that of the transmitter, a frequency shifter for adjusting the locally provided spectrum to correspond to the transmitted spectrum shifted by an amount equal to the doppler shift caused by relative movement between the radar and a reflecting object, and a cross-correlator including a multiplier jointly energized by the reflected signal and the locally provided signal, said cross-correlator additionally including means for integrating the output of the multiplier.

References Cited in the file of this patent

UNITED STATES PATENTS

| | | |
|---|---|---|
| 1,750,668 | Green | Mar. 18, 1930 |
| 2,529,510 | Manley | Nov. 14, 1950 |
| 2,583,573 | Jaynes | Jan. 29, 1952 |
| 2,586,605 | Blumlein | Feb. 9, 1952 |
| 2,614,250 | Stodola | Oct. 14, 1952 |
| 2,621,243 | Sunstein | Dec. 9, 1952 |
| 2,669,710 | Sherr | Feb. 16, 1954 |